United States Patent
Kahlert

(10) Patent No.: US 10,358,959 B2
(45) Date of Patent: Jul. 23, 2019

(54) DEVICE AND METHOD FOR CLEANING FILTERS, IN PARTICULAR PARTICULATE FILTERS

(71) Applicant: PURI tech GmbH, Waldshut-Tiengen (DE)

(72) Inventor: Bernhard Kahlert, Rietheim (CH)

(73) Assignee: PURI tech GmbH, Waldshut-Tiengen (DE)

(*) Notice: Subject to any disclaimer, the term of this patent is extended or adjusted under 35 U.S.C. 154(b) by 197 days.

(21) Appl. No.: 15/109,911

(22) PCT Filed: Jan. 6, 2015

(86) PCT No.: PCT/IB2015/050095
§ 371 (c)(1),
(2) Date: Jul. 6, 2016

(87) PCT Pub. No.: WO2015/104655
PCT Pub. Date: Jul. 16, 2015

(65) Prior Publication Data
US 2016/0326926 A1 Nov. 10, 2016

(30) Foreign Application Priority Data
Jan. 7, 2014 (DE) .......................... 10 2014 100 113

(51) Int. Cl.
*B08B 5/02* (2006.01)
*B01D 46/00* (2006.01)
*F01N 3/023* (2006.01)

(52) U.S. Cl.
CPC ........ *F01N 3/0237* (2013.01); *B01D 46/0068* (2013.01); *B08B 5/02* (2013.01); *B01D 2279/30* (2013.01)

(58) Field of Classification Search
CPC ...... F01N 3/0237; B08B 5/02; B01D 46/0068; B01D 2279/30
See application file for complete search history.

(56) References Cited

U.S. PATENT DOCUMENTS

| 2008/0178413 A1 | 7/2008 | Wagner et al. |
| 2009/0000479 A1 | 1/2009 | Streichsbier et al. |

(Continued)

FOREIGN PATENT DOCUMENTS

| EP | 2 884 065 A1 | 6/2015 |
| EP | 2 884 066 A1 | 6/2015 |

(Continued)

OTHER PUBLICATIONS

International Search Report of PCT/IB2015/050095, dated May 6, 2015.

*Primary Examiner* — David Redding
(74) *Attorney, Agent, or Firm* — Collard & Roe, P.C.

(57) ABSTRACT

A device for cleaning filter bodies includes filter channels, in particular particulate filters, the device made up substantially of an outflow assembly for supplying air, in particular compressed air, to the end face of a filter body and of a securing assembly for mounting the filter body to be cleaned. The outflow assembly is dimensioned such that it either covers, at least approximately, a plurality of filter channels of the filter body that are open towards the outflow assembly, or alternatively a cover unit is provided, the unit forming a chamber that is approximately completely sealed between the outflow assembly and the front face of the filter body. The air is delivered at least partially in pulses to the filter channels of the filter body.

3 Claims, 7 Drawing Sheets

(56) References Cited

U.S. PATENT DOCUMENTS

| 2009/0056288 | A1 | 3/2009 | Waldo |
| 2010/0088844 | A1 | 4/2010 | Cole et al. |
| 2011/0146721 | A1 | 6/2011 | Meister et al. |
| 2016/0363031 | A1 | 12/2016 | Mayer |

FOREIGN PATENT DOCUMENTS

| EP | 2 884 067 A1 | 6/2015 |
| JP | 2005-256795 A | 9/2005 |
| JP | 2015-256795 A | 9/2005 |

DEVICE AND METHOD FOR CLEANING FILTERS, IN PARTICULAR PARTICULATE FILTERS

CROSS REFERENCE TO RELATED APPLICATIONS

This application is the National Stage of PCT/IB2015/050095 filed on Jan. 6, 2015, which claims priority under 35 U.S.C. § 119 of German Application No. 10 2014 100 113.3 filed on Jan. 7, 2014, the disclosure of which is incorporated by reference. The international application under PCT article 21(2) was not published in English.

DESCRIPTION OF THE INVENTION

The present invention relates to an apparatus for cleaning filter bodies, in particular particle filters, and to a method for cleaning filter bodies, in particular particle filters.

Definition

Particle filters are to be understood to mean filters which collect solids or aerosols (hereinafter referred to as particles) that form as a result of the combustion process. Such particle filters may be used for example in (but are not restricted to) motor vehicles with a diesel engine, in order to reduce the corresponding pollutant load arising as a result of the combustion process of diesel.

The invention is not restricted to the cleaning of particle filters in particular for motor vehicles. Rather, the general expression "filter body" is to be understood to mean any type of filter which performs the filtering of solids or particles in order to remove said solids or particles from, or reduce the number thereof in, fluid flows, exhaust-gas flows or the like.

PRIOR ART

The particles emitted by internal combustion engines comprise aerosols such as for example soot particles, metal oxides from the combustion of lubricating oil, and other non-soluble organic or inorganic substances, such as for example soot, unburned fuel, burned oil constituents and other soluble organic substances and sulfur oxide substances. For the filtration of such particles, a so-called particle filter is provided which is arranged in the exhaust-gas region, for example of a motor vehicle. Through the use of a particle filter of said type, it is possible for a high proportion of the particles contained in the exhaust gas to be captured. Here, a distinction is made between combustible particles such as soot particles, which can be oxidized or regenerated during the operation of the filter by way of corresponding measures, and non-combustible particles, such as metal oxide ash from the combustion of engine lubricating oil, which can be removed from the filter only mechanically after the particle filter has been dismounted from the exhaust tract.

The exhaust-gas pressure increases continuously if the particle filter becomes increasingly laden with particles. As a result, the corresponding back pressure to the internal combustion engine increases, which leads to a deterioration in fuel consumption and to a worsened operating state and to increased engine wear. It is therefore necessary for the particle filter, which accumulates the particles within the filter, to be cleaned at regular intervals, in particular at the latest when a corresponding maximum admissible back pressure is exceeded.

Inadequate filter cleaning may be very costly and result in a malfunction of the filter. Ultimately, irreparable defects in the internal combustion engine and in the filter itself may even be caused.

Here, in the case of surface filters, the particles primarily become stuck on the surface of the filter wall or, by way of depth filtration, remain in the interior of the filter wall. Relatively large particles cannot pass through the filter wall and thus accumulate on the surface thereof. In this way, thick particle accumulation layers can form on the filter duct surface. The physically acting mechanism for the sticking of the particles to the porous filter wall is based on adhesion. The movement of the particles toward the filter wall arises primarily through the mechanism of diffusion, and has the flow of the exhaust gas through the filter superposed thereon. The filter walls themselves may be composed of different porous materials, which are normally constructed from fibres or powder. The porous walls may be arranged in the filter in a variety of ways. In the case of fibers and metal powder, it tends to be the case that areal filter walls are constructed, which are arranged in pipes, pockets or bellows. In the case of filters produced from ceramic powder, so-called "wall-flow filter monoliths", use is made of a filter duct structure in which the filter ducts are closed off in alternating fashion (with regard to the respective end). The exhaust-gas flow is thereby forced to flow through the porous wall structure. By way of the production process, it is possible to produce different geometries or characteristics of the filter material.

In the case of filter monoliths with a filter duct structure, a distinction is basically made between the following two types of particle accumulation:

Firstly, a so-called wall accumulation, which arises over the entire filter duct wall from the start of the filter duct to the end of the filter duct and which is composed of a more uniformly distributed accumulation layer of particles. Said accumulation layer is composed of a lower layer of non-oxidizable ash particles, which cannot be reduced by way of a filter regeneration, and an upper soot layer, which can be reduced by way of a regeneration during the operation of the filter. Said layer can, during a cleaning process of the filter, be removed from the filter easily and with little expenditure of force—for example byway of compressed-air pulses. This is because said accumulation layer is deposited in uniformly thin form and is thus of uniform thickness over the entire length of the filter duct, such that, during a cleaning process of the filter using compressed air, the compressed air can penetrate through the porous wall from the adjacent filter duct and detach the accumulation layer. Owing to the fact that the filter ducts are not continuous, said thin accumulation layer is deposited uniformly on the surface of the filter ducts in the inlet region of the filter body. As an exception to this, a build-up of the accumulation of non-combustible particles occurs at the filter duct and, which leads to the formation of so-called ash plugs or plug-like particle accumulations.

Said ash plug is, owing to the permanent action of the exhaust-gas pulsation, very compact in terms of its structure and thus considerably harder than the accumulation layer on the above-described filter duct wall. Consequently, said ash plug can be removed from the filter only with high expenditure of force.

A multiplicity of cleaning apparatuses is known from the prior art which clean filters that have been dismounted from the exhaust tract of an internal combustion engine. Here, media such as steam, dry ice or other fluids are used in order to correspondingly flush the filter ducts and remove particles therefrom.

In a refinement of the prior art, an apparatus is provided which receives the preferably rotationally symmetrical filter and mounts the latter such that it is rotatable about its longitudinal axes. By way of a linear movement which in each case crosses the longitudinal axis, in each case one nozzle apparatus is moved, preferably uniformly back and forth, over the upper and lower face surfaces of the filter body. The nozzle apparatus is provided in the form of compressed-air nozzles or a hose which, here, is positively guided over the face surface of the filter body with a small spacing, or is partially slid in uncontrolled fashion along the surface of the face surface. The compressed air that escapes from the nozzle is generally continuous.

A disadvantage is in particular that the rotation of the filter body and its longitudinal axis are not synchronized with the linear movement of the nozzles or of the hose, such that, with a corresponding running time and linear movement, although there is a high probability of the entire face surface being swept over at least once by the continuously emerging air jet, it is however not ensured that, in this case, too, adequate cleaning of the entire filter body in all regions has taken place.

Owing to the multiple passes over the center and the statistical probability of reliable pass-overs in the vicinity of the circumference (at the outer edge), only inefficient utilization can be attested. The process is performed in a closed cabin with a corresponding downstream suction-extraction means and a filter unit coupled thereto.

Owing to the type of construction, an air gap always exists between the air outlet at the nozzle end or at the hose end. In the case of this type of filter cleaning, high scattering losses of the compressed air arise, because, owing to reflection, some of the compressed air is diverted, and thus only some of the compressed air that flows through the cleaning installation can flow through the filter. For operation, a very high compressed-air throughflow volume is required in order to achieve approximately acceptable cleaning results.

Specifically such technical designs however have the effect that the inflowing compressed air does not pass into the base (filter duct end) of the respective filter ducts in which the ash plugs have accumulated. The compressed air—specifically the fraction which arrives at the face-side opening of the filter duct, which is significantly lower than that which exits the nozzle or the hose—flows uniformly through the filter duct, impinges on the base and escapes in the region of the base into the adjacent filter ducts. As it penetrates through into the adjacent filter ducts, the thin deposited ash layer of the adjacent filter duct is loosened and thereby discharged piece by piece. If the layer is thicker, in particular in the region of the ash plug or at the ash plug itself, the force of the compressed air is generally not sufficient to penetrate through the corresponding accumulations. Compressed air also scarcely passes into that region of the respective adjacent filter ducts which faces toward the nozzle, because, within the respective filter duct, no compressed-air column can be built up, because firstly the compressed air escapes in the region of the base, but secondly, the compressed air can also escape on the side facing toward the nozzle—outside the filter duct.

The inadequate cleaning performance of the apparatuses known from the prior art necessitate additional and time-consuming thermal treatments. This means that the filter body, before and/or after the mechanical cleaning thereof, must also undergo thermal cleaning by heating. The thermal cleaning however has the disadvantage that the catalytically active filter coating within the filter body is additionally damaged as a result of said cleaning process. A further disadvantage consists in the fact that the thermal process takes a very long time. Time durations of up to ten hours must be allowed for. Thereafter, a further cleaning process must be performed. In the case of heavily contaminated filter bodies, the cleaning process must possibly be repeated several times in order to achieve an acceptable cleaning result.

OBJECT OF THE INVENTION

It is the object of the invention to provide an apparatus and a method with which it is possible to realize a more efficient cleaning action of filter bodies with a filter duct structure, in particular of particle filters.

ACHIEVEMENT OF THE OBJECT

The object is achieved by way of the features described herein.

Advantages of the Invention

The apparatus and the method are suitable in particular for "wall-flow filter monoliths". The monolithic filter body has, at its two face sides, correspondingly open and closed filter ducts. If a filter duct is closed off on one face side, said filter duct is open on the opposite face side. The adjacent walls of the respective filter ducts are porous such that an exchange can take place from the centrally arranged filter duct to the respectively adjacent filter ducts. The exhaust-gas flow that is laden with particles flows into the particle filter from the so-called filter inlet side, such that the particles collect in the base of the respective filter duct as viewed in the inflow direction. The particles diffuse through the wall of the respective filter duct into the adjacent filter duct and accumulate there. The exhaust-gas flow emerges, at least with a reduced number of particles, on the filter outlet side.

The advantage of this technical embodiment of the cleaning apparatus consists in the inflow unit. For carrying out the cleaning process of the particle filter, said inflow unit is firstly mounted onto the filter outlet side. By virtue of the fact that, by way of the inflow unit, compressed air is introduced not only into one filter duct but also into the adjacent and the further adjacent filter ducts, a significantly better cleaning result can be achieved. The immediately adjacent filter ducts are in each case closed off, whereas the filter ducts adjacent thereto are, in turn, open. Thus, a pressure column is built up in the further adjacent filter ducts, such that it is scarcely possible, or not possible, for an air flow to pass into said further adjacent filter ducts from the adjacent filter ducts through the walls of the filter ducts. The pressure within the respective filter duct is maintained. Thus, sufficient compressed air also passes into the respective base of the filter duct (these are the filter ducts that are open on the filter inlet side), by virtue of the fact that the pressure column remains built up in the respectively adjacent filter ducts.

The invention is thus distinguished by the fact that an apparatus and a method are provided with which not only the accumulation layer of particles on the filter duct walls, which is relatively easy to clean, but in particular the hard ash plugs that form in the rear region or in the base of the filter ducts, can be removed from the particle filter. The apparatus and method known from the prior art are only very inadequately capable of removing the ash plug from the filter. If the ash plug is not removed or is incompletely removed, the operational performance and service life of the filter are reduced, fuel consumption is increased, and thus the pollutant emissions such as also the $CO_2$ emissions are increased, and the operating costs of the filter are very considerably increased.

Therefore, the apparatus and the method proposed here differ by the fact that an outflow device is formed which does not form a spacing between itself and the face side of the particle filter, and thus the compressed air that is generated can be introduced directly into those filter ducts which point toward the outflow device. There is virtually no laterally escaping compressed-air flow. The compressed air that is provided is thus introduced in targeted fashion into multiple mutually adjacent filter ducts, specifically in such a way that a pressure column forms within those filter ducts which are open toward the outflow device. In this way, the ash plugs at the duct ends (base) of the adjacent filter ducts are also reached.

The outflow device is preferably circular and covers a number of closed and open filter ducts. Alternatives may also be of polygonal form, such that the corner regions can be acted on efficiently with compressed air.

The further basic concept of the invention consists in cleaning the filter body, or the filter ducts thereof, using pulsed compressed air, rapid shocks of compressed air, or intense pulses. Here, the compressed air is conducted through the particle filter in abrupt pressure waves with intense impetus in the form of rapid compressed-air shocks milliseconds in length. Said compressed-air shock has very much greater kinetic energy than a uniform air flow, such as is known from the prior art. The pulsed compressed air is preferably implemented by way of an outflow device which is designed such that the compressed-air jet can be introduced in an efficient manner directly into some of the filter ducts of the particle filter. Here, provision is preferably made whereby only a small spacing, or no spacing, is present between the face sides of the filter bodies and the outflow device, such that compressed air is prevented from escaping outside the outflow device.

Owing to the fact that selectively also pulsed air is output by way of the outflow device, an air column likewise builds up in the centrally arranged filter ducts owing to the air columns in the further adjacent filter ducts. This in turn yields the advantage that accumulations in the adjacent filter ducts are loosened, such that said accumulations can be blown out at the latest when the further face side is subjected to an impingement of air.

After a defined holding time over the respectively central filter ducts, the outflow device is preferably raised and moved to the next setting-down point. Here, the compressed air is shut off, such that the cleaning can also be performed in a highly efficient and cost-saving manner.

The outflow device is advantageously designed so as to have a diameter larger than that of a filter duct to be cleaned. It is preferably the case that, in the diameter, at least fifteen to thirty (inflow) filter ducts are covered, wherein the outer edge of the outflow device provides a sealing means in order that no compressed air can escape. The outflow device is thus set down on the face surface of the filter ducts to be cleaned.

The spacing of the setting-down points is dependent on the effective diameter of the respective outflow device, and may be set as required. Through the use of a kinematic mechanism which ensures the positioning of the outflow device, of which at least one is provided on each face side of a filter body, provision may additionally also be made whereby the filter body itself can still be rotated about its axis. In an alternative embodiment, provision is made whereby the filter body is rotated about its transverse axis through 180 degrees, such that cleaning can also be performed from both sides sequentially one after the other.

The outflow device can, by way of a corresponding automatic kinematic mechanism, for example a unidirectional, bidirectional or tridirectional system, be moved to any desired position of the face side of the respective filter body. The system also makes it possible for the movement paths to be optimized or restricted if other filter bodies are present (for example square or other shapes). The outflow device may be guided by way of a manipulator such as is known from the prior art. The movement sequences may be programmed in advance—preferably in a manner dependent on the type of construction of the particle filter and on the associated size—such that automatic cleaning can be performed in the embodiment of an automated system.

A further alternative embodiment provides that the cleaning is performed both on one face side and on the opposite face side simultaneously or with a time offset, wherein the corresponding outflow devices with the necessary kinematic mechanisms are arranged to both sides.

As an alternative to this, provision may also be made whereby the two outflow devices arranged in each case at the face sides interact synchronously with one another. The controller provided for the handling of the respective outflow devices is preferably individually controllable.

As already described above, the cleaning is performed for example by way of pulsed compressed air. A particular embodiment provides for said compressed-air pulse to in turn initially be divided into a pulse phase provided in a corresponding time interval, said pulse phase then being followed by a pressure-holding phase, likewise with a defined time interval. Owing to the position of the outflow device over the respective filter ducts, it is thus possible for a defined number of compressed-air pulses to be introduced substantially without losses into the filter body.

The mounting of the outflow device directly onto the filter body likewise has the effect that the pressure profile with regard to the filter body or the respective filter ducts can be monitored. So-called real-time monitoring yields the corresponding pressure profile. An apparatus integrated in the cleaning apparatus serves firstly to determine the particle loading level of the respective filter body in the delivered state, that is to say before the start of the cleaning process, as a so-called initial inspection, and to identify whether or not the filter has been overloaded. The detection is performed by way of the determination of the pressure difference from the introduction into the filter duct, and by way of the blowback. In a further step, the measurement of the corresponding cleaning performance and of the level of cleanliness of the filter body is then performed even during and after the cleaning and for interim and final inspection.

Defective apertures within the filter body, such as for example cracks, holes, wall apertures, and blockages as a result of the formation of so-called ash webs in the front or middle regions of the depth of the filter duct, which arise after excessive introduction of lubricating oil ash into the filter, and also of incidences of melting of the ceramic filter material as a result of so-called "worst-case" regenerations, local incidences of overheating resulting therefrom, can likewise be identified by way of the corresponding pressure differences.

Owing to the real-time monitoring, it is likewise possible to obtain an overall picture of the filter body. After corresponding cleaning steps, it can then be decided, also automatically or manually, whether certain regions which are overloaded and in which the corresponding pressure pulses have not exhibited an adequate effect are subjected to cleaning once again.

The system makes it possible for the individual regions of the filter body or of the filter ducts to be moved to once again and for the cleaning process to be performed there once again. Alternatively, in the event that defects in the filter are detected, it can be decided, automatically or manually, whether the cleaning process is terminated immediately after the detection of the defect.

Another refinement, also in combination with the devices described above, provides for a further diagnostic device to be provided. Said further diagnostic device can be integrated in the cleaning installation as a module. Said further diagnostic device serves for the monitoring of the catalytic coating of the corresponding filter. For this purpose, provision is made for a test gas with a concentration of nitrogen monoxide (NO) or carbon monoxide (CO) or hydrocarbons (HC) or optionally exhaust gas of an internal combustion engine to be introduced by way of the outflow device, and for a measurement to subsequently be performed using a sensor on the opposite side as regards the extent to which, and in what amounts, nitrogen dioxide (NO2) or carbon dioxide (CO2) or hydrocarbons (HC) emerge. Vehicles or internal combustion engines certified as conforming to the emissions class Euro VI must adhere to a number-based limit value for emissions of nanoparticles (superfine particles). An inspection of the filter with regard to its separation efficiency for nanoparticles (superfine particles) after the cleaning has been performed is therefore expedient. Therefore, a further diagnostic device is provided for the monitoring of the particle filter with regard to its separation efficiency for nanoparticles (superfine particles). For this purpose, provision is made for a test gas with a concentration of nanoparticles (superfine particles) or optionally exhaust gas of an internal combustion engine to be introduced by way of the outflow device, and for a measurement to subsequently be performed using a corresponding particle counter on the opposite side as regards the extent to which, and in what numbers, nanoparticles (superfine particles) emerge.

Furthermore, a diagnostic module for the detection of engine oil contamination in the filter body is provided. The corresponding test liquids, with a sensor provided for the same, serve for the implementation of a diagnosis. A time-based depth measurement using a probe or using corresponding electromagnetic waves likewise yields information regarding the quality of the cleaned filter body.

A refinement provides that, on the basis of the serial number or some other unique identifier, the respective filter body is identified such that the system can automatically set itself to the possible movement paths and also the corresponding grid sizes of the respective filter ducts on the face sides of the filter bodies. Only in this way is a targeted movement to the respective filter ducts possible. A preferred refinement provides for the data of the respective filter bodies, such as for example dimensions, grid size, operating hours, base loading value etc. to be stored in a database such that, by way of corresponding communication means (WLAN, LAN connection, GSM or similar connections), the respective cleaning apparatuses obtain and store the required data also the cleaning results. Provision is also made for a database to be created for the in each case already used filter bodies, such that, centrally, the life cycle of a filter body of said type can be documented, and the cleaning interval thereof, can also be correspondingly represented.

One of the major advantages of the apparatus thus lies in the fact that the cleaning performance is considerably improved in relation to the prior art. In particular, the apparatus is capable of removing from the filter the hard ash plug which forms in the rear region of the filter duct.

A further major advantage of the apparatus lies in the fact that the cleaning duration is very greatly shortened as a result of the elimination of the need for additional thermal cleaning by heating.

By way of an adequate overlap of the corresponding effective diameters, it is ensured that the entire area of the respective filter body is covered virtually without gaps.

Through the specification of the corresponding setting-down points, it is ensured that every region of the filter surface in the form of a setting-down point can be blown out at least exactly once and/or even multiple times in a defined manner.

Randomness or probabilities or at least single pass-overs or enforced multiple pass-overs, such as are known from the prior art, are thus ruled out. The benefit thus lies in defined cleaning of the filter body over the entire filter body surface, and in the fact that efficient use of the machine time and of the energy (also of the compressed air) is realized.

Furthermore, it is made possible that, after the inspection of the cleaning result, selected regions are moved to again in a defined manner, and cleaned again, without losses.

The possibility of real-time monitoring, the residue of the residual level of contamination, and the following automatic optimization of the cleaning strategy for the present filter body without interruption of the cleaning process (optimally cleaned setting-down points with low counterpressure) are excluded from the further cleaning (setting-down points with a counterpressure above the target value can automatically always be moved to for a cleaning process) until the aim is achieved or a further improvement is no longer obtained.

In this way, every filter body can be cleaned with a minimum required cleaning time and minimum required outlay with regard to energy usage.

There is no need whatsoever for external measurement means for determining the cleaning quality and for obtaining data for the cleaning log or the respectively provided quality control system.

With regard to the cost/benefit advantage, it should be noted that additional pre-cleaning or post-cleaning, such as for example thermal cleaning by burning out the filter, is avoided entirely. Further intermediate cleaning steps and inspection steps are likewise omitted.

A further regeneration furnace for the annealing is thus no longer necessary.

The system and the described method permit filter cleaning during the regular vehicle and machine maintenance in the workshop. Owing to the targeted injection technique and the use of exclusively air, no influencing of the catalytic filter coating of the filter body occurs. Aside from the realization of maintenance intervals of equal length, the filter service life can be increased yet further, and the filter can also exhibit almost full performance again after a cleaning process.

A further operating cost advantage can be seen in the fact that much less compressed air is required.

Owing to the monitoring system and the continuous measurement of the counterpressure, virtually gapless recording of a datasheet for a defined filter body is possible at all times. Technical connections, for example via WLAN, LAN or other data connections, yield the possibility of the data being stored in a "cloud", such that access can be obtained at all times from any location for different purposes.

Also, owing to precisely such a database, it is necessary to develop an intelligent system which yields the possibility of intervening in the cleaning process in an effective manner from a remote location with corresponding parameters.

Further advantageous embodiments will emerge from the following description and from the drawings:

DRAWINGS

FIGS. 1A-C show a schematic illustration of a filter body, of an interior of the filter body with the corresponding filter ducts, and an illustration of the flows within the filter body;

FIGS. 2A-B show a schematic illustration of the operating method of the outflow device in relation to the prior art;

DESCRIPTION OF AN EXEMPLARY EMBODIMENT

Figure 1A:
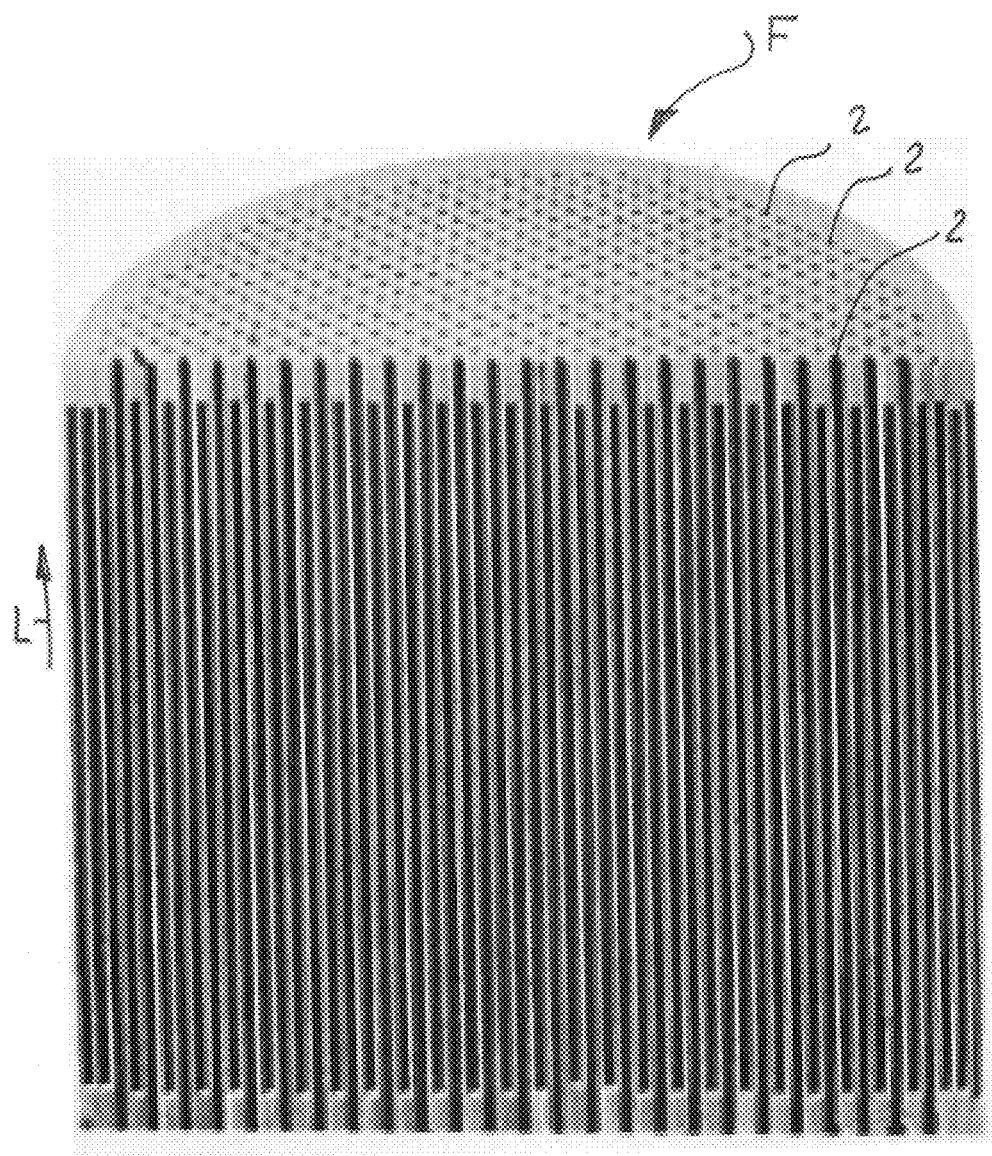

FIGS. 1A and B illustrate a filter body F. The filter body F has a honeycomb-like structure, in such a way that individual filter ducts 2 are formed in a longitudinal direction L of the filter body F. The filter ducts 2 are arranged in parallel.

The mutually adjacent filter ducts 2 have walls 3 (FIG. 1C) which are permeable to at least some of the particles, such that the throughflow of an exhaust-gas flow, for example, takes place in accordance with the arrow directions 4 illustrated in the figures.

The filter body F illustrated in the FIGS. is a ceramic filter, specifically a "wall-flow filter monolith". This is distinguished by the fact that, on the filter inlet side E (the side at which the exhaust-gas flow enters the filter body F), are equipped with filter ducts 2, which are open toward said side and which are closed off on the filter outlet side A, and vice versa. In this way, the exhaust-gas flow is forced to firstly enter the filter ducts 2 provided on the filter inlet side E and then diffuse through the permeable walls 3, before the exhaust-gas flow then emerges through the adjacent filter ducts 2 to the filter outlet side A.

The accumulation of particles takes place on the inner surfaces of the filter ducts 2, such that, over time, the individual filter ducts K become laden with particles.

Figure 1B:
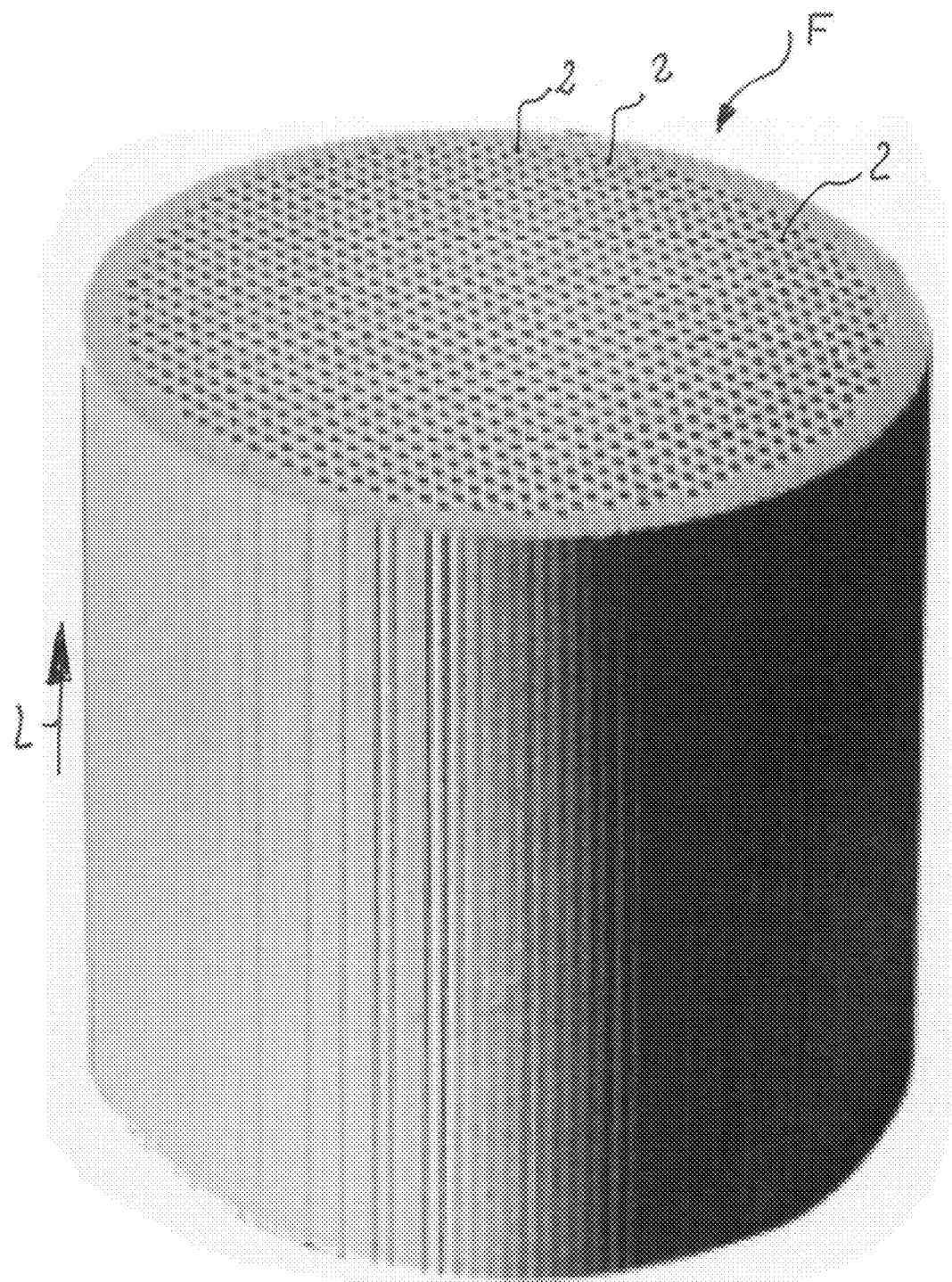
Figure 1C:
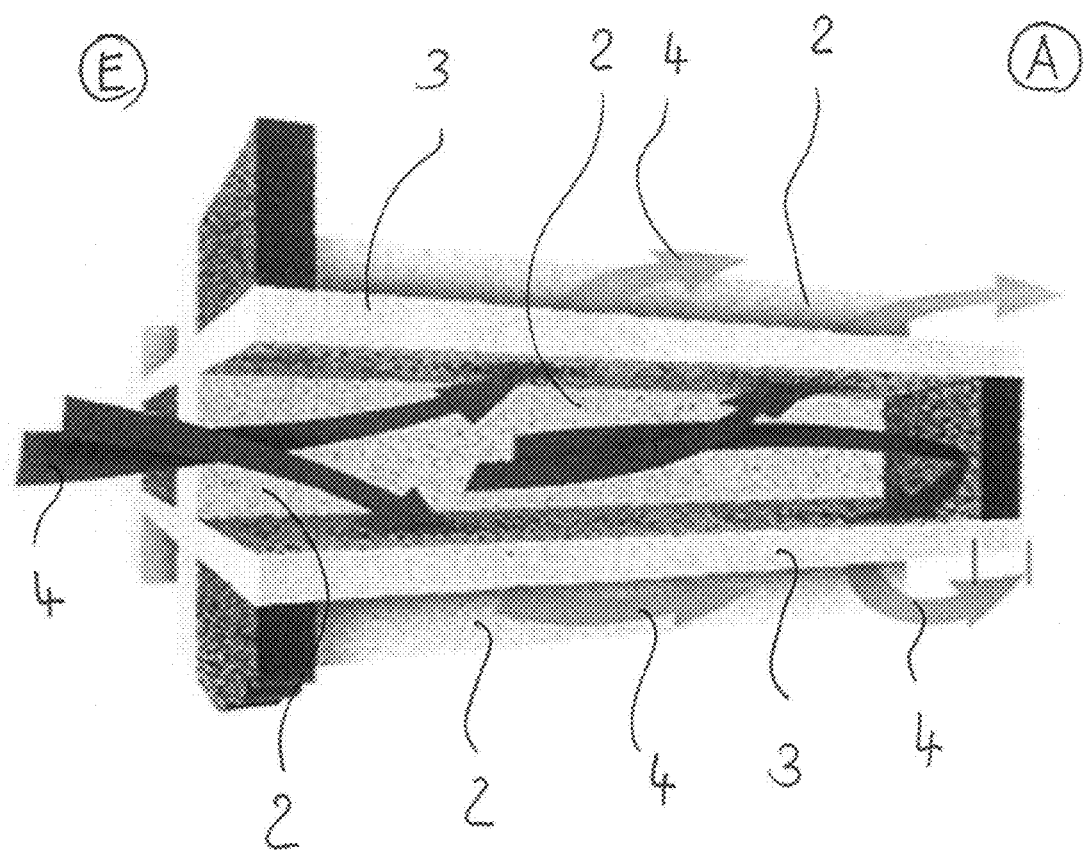
Figure 2A:
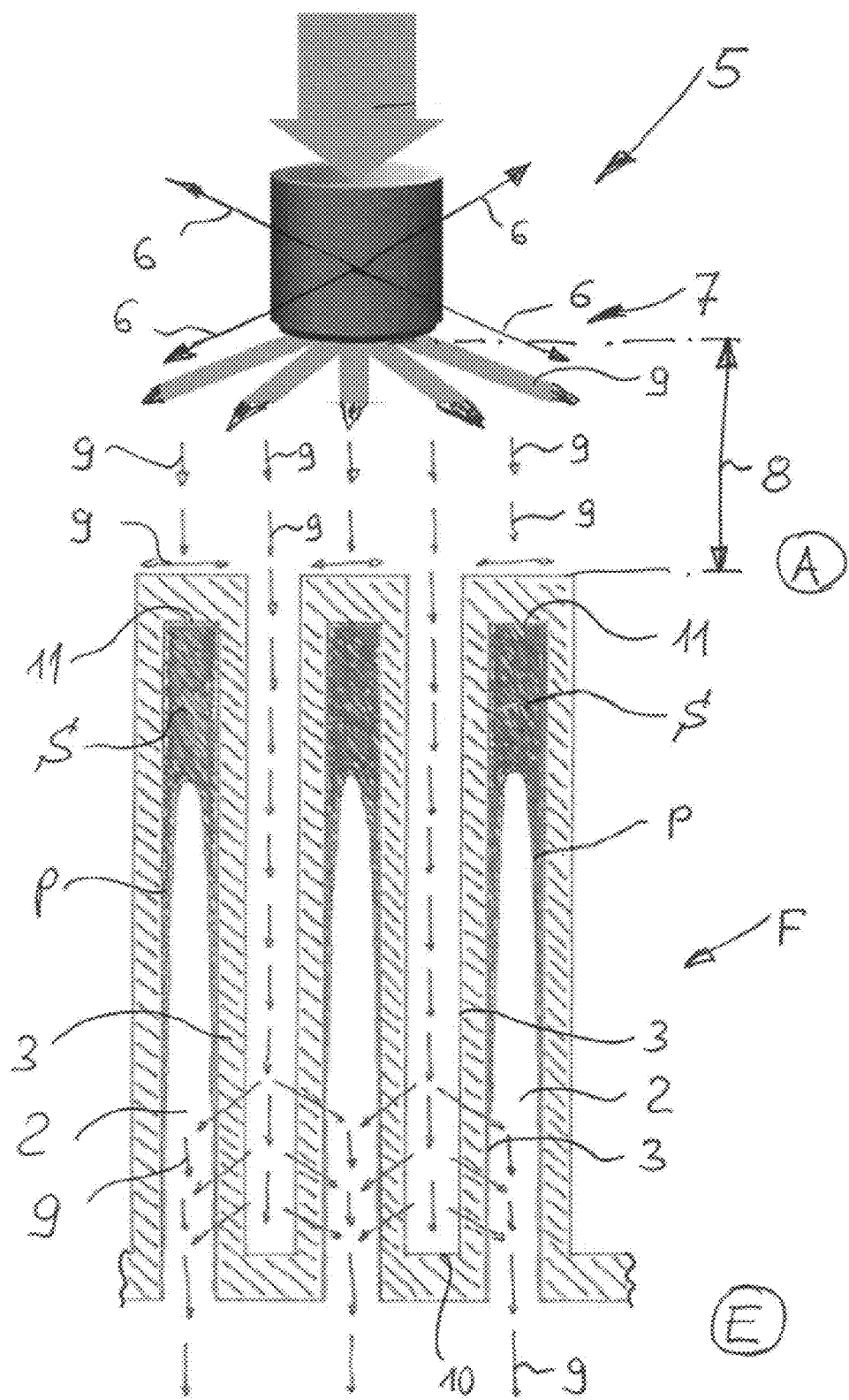

FIG. 2A schematically shows a simple apparatus for the cleaning of filter bodies F (as illustrated in FIG. 1) as per the embodiments from the prior art. Said filter body has a filter outlet side A and a filter inlet side E. Those filter ducts which are open toward the filter inlet side E are laden with particles P. The particles are deposited on the walls 3 and on the respective base 11, where, in particular, plug-like particle accumulations S form.

The apparatus is composed of a housing (not illustrated in any more detail) and a cleaning apparatus 5 arranged within the housing, which cleaning apparatus is illustrated schematically in FIG. 2A. The apparatus has a holding apparatus which is suitable for receiving and fixing the filter body F in a defined position. The cleaning apparatus 5 has a manipulator with one or more degrees of freedom (arrows 6 in FIG. 2A). On the free end thereof there is arranged an outflow device 7. Said outflow device is supplied with air by way of devices that are not illustrated in any more detail. The outflow device 7 is a nozzle which introduces a uniform air flow into the filter ducts 2 on the filter outlet side A. Here, the nozzle is arranged with a spacing 8 to the face side of the filter outlet side A of the filter body F. The uniform air flow is now—as illustrated by way of the arrows 9—caused to impinge on the face side of the filter body F, and passes only partially into the filter duct 2. There, the air flows onward as far as the base 10 of the respective filter duct 2, which is open toward the filter outlet side A, and diffuses through the wall 3 into the adjacent filter duct 2, which is open toward the filter inlet side E. A diffusion into the adjacent filter duct and onward in the direction of the filter outlet side A is not possible, because the pressure within the filter duct 2 is not sufficient to act against the wall 3 which is acted on by the particles P and in particular by the plug-like particle accumulations. For this reason, cleaning is at least only inadequately possible in particular in said regions.

Figure 2B:
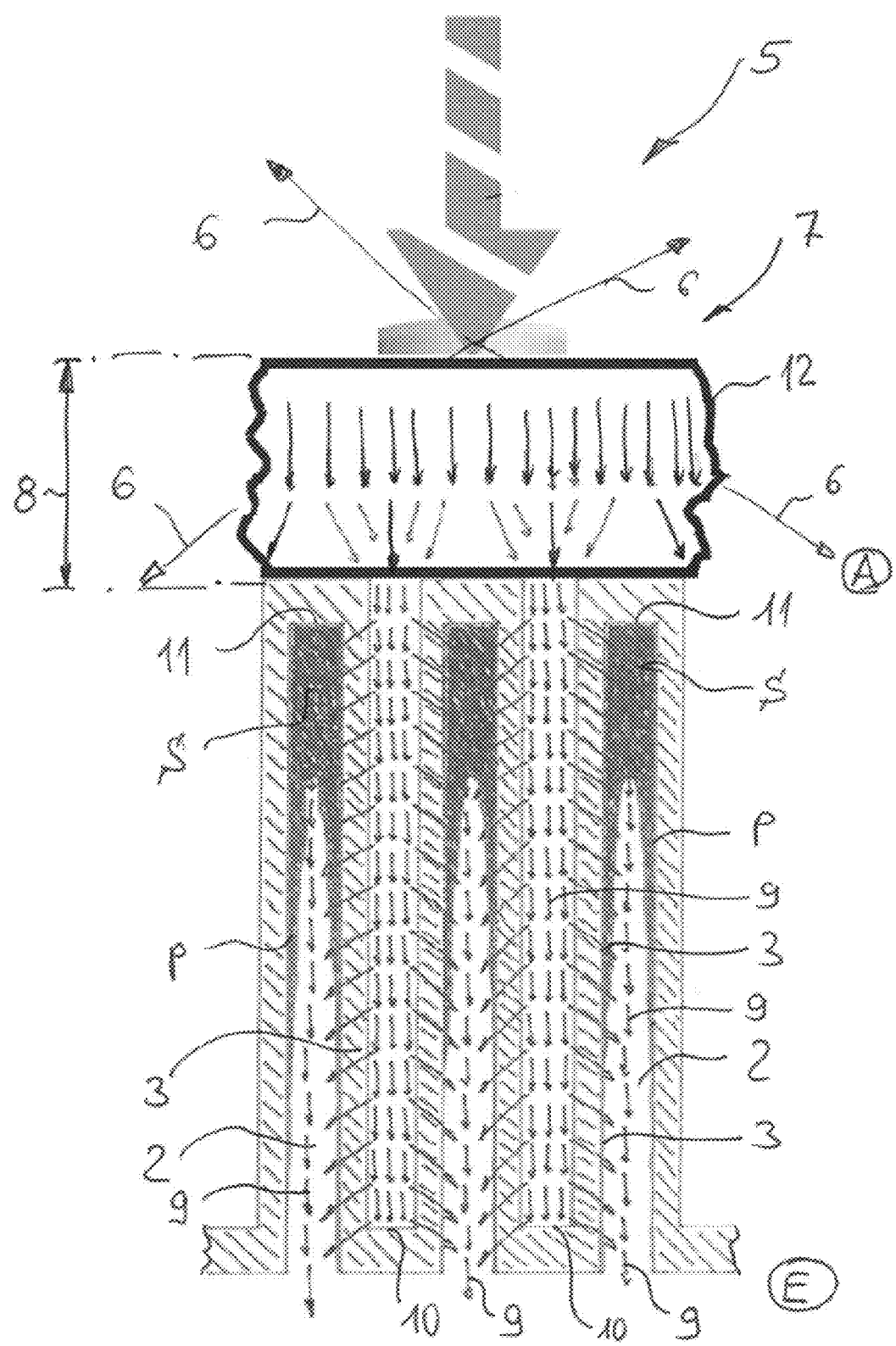

FIG. 2B shows the difference in relation to the prior art, and thus shows the invention. This provides an outflow device 7 which covers a multiplicity of filter ducts 2 that are open toward the filter outlet side A, such that no spacing is provided between the outflow device 7 and the face side of the filter body F. Alternatively, a covering unit 12 is provided which is arranged in the region of the spacing 8 and which forms an at least approximately closed space between the outflow device 7 and the face side of the filter body F. The compressed air emitted by the outflow device flows directly into the openings of the filter ducts 2 in the arrow direction 9. The covering unit 12 is to be understood as an optional device, if the spacing 8 between outflow unit 7 and the filter outlet side A or the filter inlet side E is too large.

The illustrated outflow unit 7 as part of a cleaning apparatus. Said cleaning apparatus comprises a housing in which the filter body F to be cleaned can be arranged or fixed.

Suction extraction devices ensure that the particles that are blown out of the filter body F are disposed of appropriately.

Since the compressed air flows in with an adequate flow rate and cannot escape on the face side, a compressed-air column is generated within the filter ducts 2 (as indicated by multiple arrows 9 depicted in parallel).

If the compressed air provided by the outflow device 7 is at least intermittently provided in pulsed fashion, or is configured as a pressure shock, the compressed air in the region in which the plug-like particle accumulations S are present also diffuses, such that said particle accumulations can be loosened and released.

The outflow device 7 illustrated in FIG. 2B represents merely an exemplary embodiment. The invention of the outflow device 7 can be transferred to any types of apparatuses 2, regardless of whether the outflow device 7 is guided by a manipulator and the filter body F is moved relative to the outflow device 7, or the outflow device 7 is static and the filter body F is moved relative thereto. Here, it is also not important whether the air flow is conducted vertically or horizontally through the filter body F. The outflow device 7 is preferably of areal form and capable of being arranged parallel to the face side of the filter body F. Said outflow device has one or more outlet openings from which air, in particular compressed air, is discharged, which air or compressed air then passes into the corresponding filter ducts 2 of the filter body F.

Figure 3:
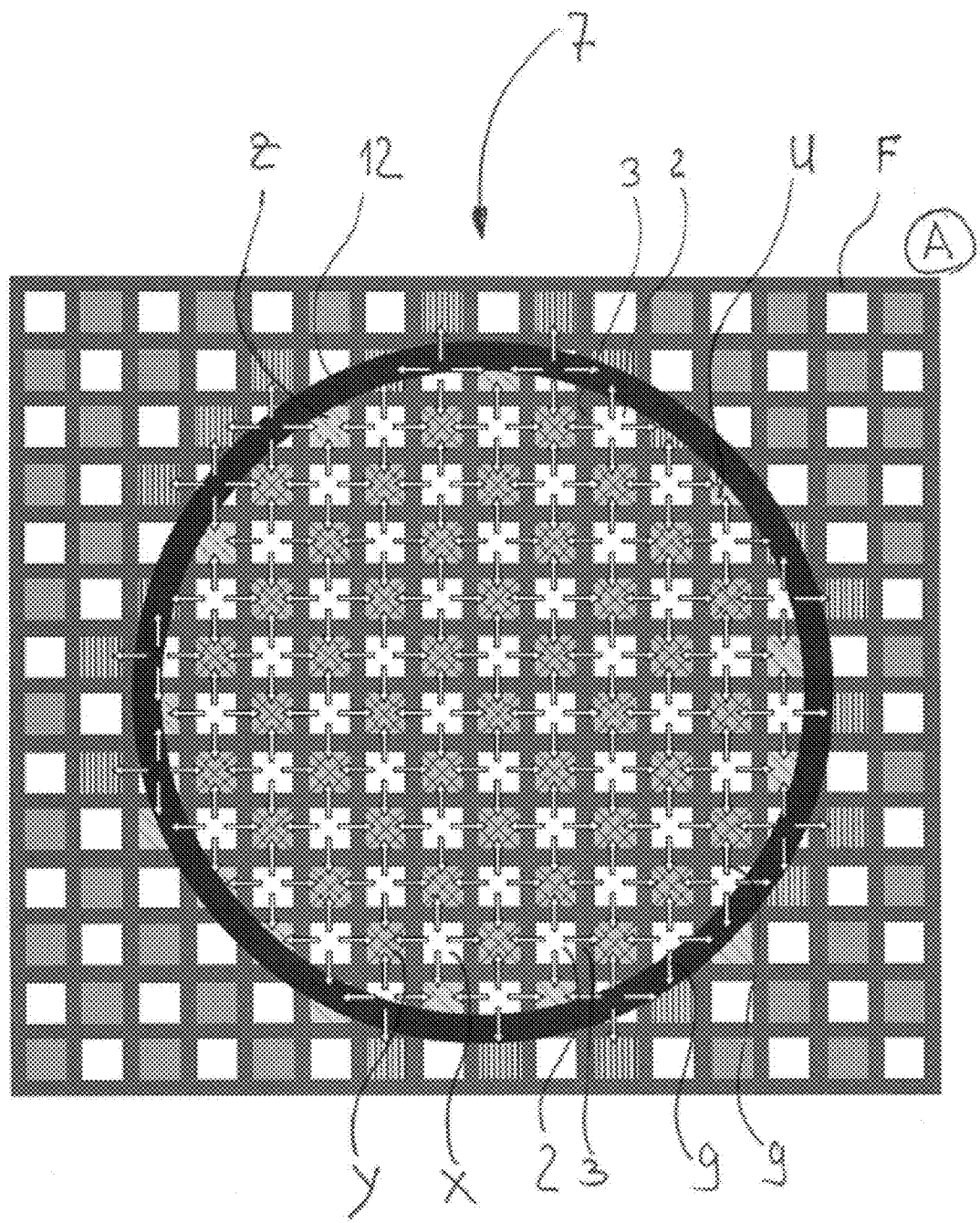
FIG. 3 shows a schematic illustration of the operating method of the outflow device in relation to the filter ducts, which are to be cleaned, of a filter body.

FIG. 3 schematically illustrates a plan view of a filter body F to be cleaned. A detail shows the chessboard-like structure of the respective filter ducts K. Here, those filter ducts 2 which are open toward the plane of the image are illustrated in white. The closed filter ducts 2 are illustrated with dark shading. This view corresponds to the face side of the filter body F on the filter outlet side A. This means that, when said face side is impinged on by air, air can pass into the filter body F only through the openings (illustrated in white). The corresponding arrows 9 show the respective air flows, which correspond to those in FIG. 2A.

The outflow device 7 is schematically illustrated as a ring-shaped element, wherein the arrows 9 arranged within the outflow device 7 show the path of the compressed air within the filter body F (diffusion through the walls 3 of the filter ducts 2). For this purpose, provision is advantageously made for the outflow device 7 to have multiple outlet openings for the discharge of the compressed air. Said outlet openings are preferably arranged parallel and adjacent to one another (similarly to a shower head). A refinement provides for the individual outlet openings to be of nozzle-like form and adjustable with regard to their discharge direction. Provision is alternatively made for a single outlet opening to be provided, the diameter of which approximately corresponds to that of the outflow opening 7, such that, byway of the outlet opening, multiple filter ducts which end on the face side can be subjected to an impingement of air.

The compressed air is preferably discharged from the outflow device 7 in pulsed fashion, and flows, over the entire extent of the diameter of the outflow device 7, onto the end surface of the filter body F to be cleaned. If the outflow device 7 is not fully seated on the face side of the filter body F, the corresponding covering unit 12 ensures that at least almost no compressed air can escape outside the outflow device 7. The covering unit 12 is to be understood as a type of rubber-like skirt which surrounds the outflow unit 7 and which comes into contact with the face side of the filter body F. In this way, an approximately closed space is formed between the one or more outlet openings of the outflow unit and the face side of the filter body F, such that no scattering losses of compressed air arise, and all of the energy can be introduced into the filter ducts.

The outflow device is therefore, according to the invention, significantly larger than a filter duct to be cleaned, and thus has a diameter which encompasses multiple filter ducts which end on the face side. It is preferable for multiple filter ducts which end on the face side to be covered, in particular filter ducts which have adjacent filter ducts on each side. Corresponding sealing means ensure that the compressed air passes in targeted fashion into the filter ducts 2, which are to be cleaned, of the filter body F. As sealing means, the above-described covering unit 12 may be provided.

Below, by way of example, four filter ducts 2 will be considered, which are denoted in FIG. 3 by the letters U, X, Y and Z. These are filter ducts 2 which are subjected to a flow of the compressed air but which behave differently owing to their position within the outflow device 7.

The filter ducts 2 denoted by X are positioned so as to be open toward the filter outlet side A. During the cleaning process, compressed air flows through said filter ducts, and the pressure column forms.

The filter ducts 2 denoted by U are positioned so as to be open toward the filter inlet side E. Said filter ducts are impinged on (to a minor extent) on two sides because in each case one pressure column has built up in the two adjacent filter ducts 2. Owing to the minor impingement, a low force is exerted on the particles P and on the plug-like particle accumulation S.

The filter ducts 2 denoted by Y are positioned so as to be open toward the filter inlet side E. Said filter ducts are impinged on from four sides, because in each case one pressure column has built up in the four adjacent filter ducts 2. Owing to the intense impingement, a very high force is exerted on the particles P and on the plug-like particle accumulation S.

The filter ducts 2 denoted by Z are positioned so as to be open toward the filter inlet side E. Said filter ducts are impinged on from three sides, because in each case one pressure column has built up in the three adjacent filter ducts 2. Owing to the intense impingement, a very high force is exerted on the particles P and on the plug-like particle accumulation S.

If the air jet is correspondingly pulsed, it has been found that the cleaning efficiency is increased. If the compressed air is discharged in pulsed fashion, provision may preferably also be made for said compressed air to repeatedly output multiple rapid compressed-air shocks. In this way, within the respective filter duct 2, an air column is generated as far as the base, which has the effect that the further pulsed compressed air seeks ways of passing into the adjacent filter duct 2 no longer as far as the base G but over a much greater length within the filter duct 2. In this way, it is possible for even the plug-like particle accumulation S to be released.

Figure 4:
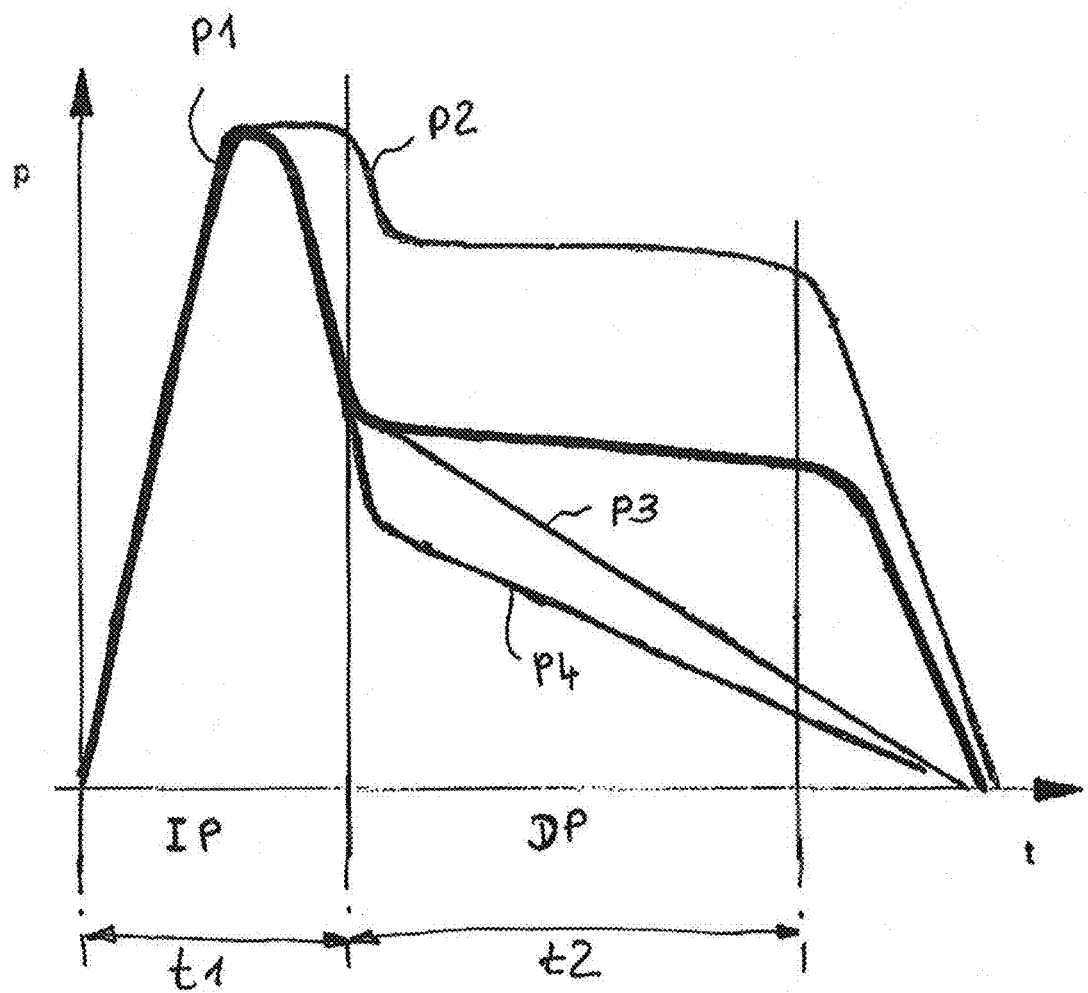
FIG. 4 shows a schematic illustration of the pressure profile of the outflow device of the cleaning apparatus.

FIG. 4 schematically illustrates the possible pressure profiles of the compressed air that emerges from the outflow device 7 versus time (t) and pressure (p).

The curve P1 shows the pressure profile in the case of a normally loaded particle-laden filter body F. Firstly, by way of pulsed high pressure (pulse phase IP), the pressure column is built up within the filter ducts 2 in order, in particular, to loosen intensely compacted particles but also the plug-like particle accumulations S. Subsequently, by way of continuous compressed-air discharge (pressure-holding phase DP), blowing-out and thus removal of the particles from the filter body F is effected. Depending on filter, filter size and filter duct size of the respective filter bodies, the pulse phases (time period t1) and pressure-holding phases (time period t2) are configured differently in terms of time. An intense pulse ensures that the compacted material arranged within the filter ducts, in particular the hard accumulations in the rear region of the filter duct, the so-called ash plug, is released. Byway of the pressure in the pressure-holding phase, the released mass is conveyed through the filter duct to one side, specifically until said mass also correspondingly emerges.

Owing to the fact that the outflow device is set down directly onto the filter ducts of the filter body, it is possible, by way of a corresponding counterpressure, to identify whether the filter loading is high (pressure profile in the case of excessively high filter loading) or whether defects are present within the filter (pressure profile in the case of fracture within the substrate or pressure profile in the case of a hole on a face surface). The corresponding feedback thus already effects a direct adaptation to the corresponding method.

For example, if sensors identify that the pressure profile does not correspond to the profile of the curve P1, it is possible, on the basis of the different pressure profiles, in particular in the pressure-holding phase DP, for conclusions to be drawn regarding the technical function of the filter body F.

Accordingly, the curve P2 represents a pressure profile which corresponds to a high filter load with particles, inter alia as a result of blockage or melting.

The curve P3 shows a pressure profile which infers the presence of a fracture or crack within the filter, in particular within the filter ducts 2.

The curve P4 also infers the presence of a hole on the face side of the filter body F.

Cleaning Process

As already described, the filter body F is, in a first cleaning process, subjected to an impingement of compressed air from the filter outlet side A by way of the outflow device 7. In said cleaning process, first accumulations on the walls are already removed, and the plug-like particle accumulations are at least loosened.

In a second cleaning process (for this purpose, the filter body F is rotated or the outflow device changes its position), the outflow device 7 is set down on the filter inlet side. Said second cleaning process serves, by way of the same functional principle (standing compressed-air column in the adjacent filter ducts) for exerting an intense pressure pulse/high pressure forces on the plug-like particle accumulations S. Furthermore, provision is made for the plug-like particle accumulation that has already been loosened as a result of the first cleaning step and/or at least partially released and possibly also pushed in the filter duct in the direction of the outlet to be broken up or comminuted.

The second cleaning step is then followed by the third cleaning step, which is identical to the first cleaning step (cleaning from the filter outlet side A again). Thus, the plug-like particle accumulation which, as a result of the second cleaning step, has been further released and/or pushed in the direction of the filter duct outlet and/or comminuted is then blown fully out of the filter body (out of the filter duct).

The corresponding data processing of the measurement values, but also the values of the filter bodies, or the monitoring, ensures that every filter body is treated and processed individually in accordance with its dimensions but also its usage and its state. Corresponding documentation, with regard also to quality management, is performed both offline and online. This makes it possible for one and the same filter to be cleaned at different locations. In this way, it is made possible for the corresponding data relating to the life cycle of the respective filter body to made available online (for example in a cloud) such that it can, at all times and from any location, be viewed, accessed and processed further or supplemented.

LIST OF REFERENCE DESIGNATIONS

1 —
2 Filter duct
3 Wall
4 Arrow, exhaust-gas flow
5 Cleaning apparatus
6 Arrow, air flow
7 Outflow device
8 Spacing
9 Arrow, air flow
10 Base of filter duct (open toward the filter outlet side)
11 Base of filter duct (open toward the filter inlet side)
12 Covering unit
A Filter outlet side
E Filter inlet side
F Filter body
L Longitudinal direction
P Particle
S Plug-like particle accumulation
IP Pulse phase
DP Pressure phase
P1-P4 Curves
U,V,X,Y,Z Exemplary filter ducts 2

The invention claimed is:

1. An apparatus for cleaning filter bodies having filter ducts, the apparatus substantially comprising an outflow device for subjecting a face side of a filter body to an impingement of air and comprising a device for the mounting of the filter body to be cleaned, wherein
   the outflow device is a nozzle which is arranged on the free end of a manipulator,
   the outflow device is, in terms of diameter, much larger than a filter duct to be cleaned, and is dimensioned so as to selectively either at least approximately cover multiple open filter ducts, which end at the face side, of the filter body, or a covering unit is provided which forms an at least approximately closed space between the outflow device and the face side of the filter body, and
   the outflow device has at least one discharge opening for the discharge of the air, wherein
   the outflow device is configured to deliver the air in pulsed fashion into the filter ducts of the filter body.

2. The apparatus as claimed in claim 1, wherein the covering unit is formed as an elastic skirt which surrounds the outflow unit and which comes into contact with the face side of the filter body.

3. The apparatus as claimed in claim 1, wherein the outflow device has multiple discharge openings for the discharge of the air.

* * * * *